(12) United States Patent
Gat

(10) Patent No.: US 6,659,047 B2
(45) Date of Patent: Dec. 9, 2003

(54) ANIMAL TOE NAIL COVERS

(76) Inventor: Erann Gat, 652 Millard Canyon Rd., Alta Dena, CA (US) 91001

( * ) Notice: Subject to any disclaimer, the term of this patent is extended or adjusted under 35 U.S.C. 154(b) by 0 days.

(21) Appl. No.: 10/295,344

(22) Filed: Nov. 15, 2002

(65) Prior Publication Data

US 2003/0145805 A1 Aug. 7, 2003

Related U.S. Application Data

(60) Provisional application No. 60/354,638, filed on Feb. 5, 2002.

(51) Int. Cl.$^7$ ............................................... A01K 13/00
(52) U.S. Cl. .................................................... 119/851
(58) Field of Search .............................. 119/851, 837; 2/21; 132/73; 215/220

(56) References Cited

U.S. PATENT DOCUMENTS

| | | | | |
|---|---|---|---|---|
| 352,337 A | * | 11/1886 | Markham | 119/851 |
| 365,856 A | * | 7/1887 | Parks | 119/851 |
| 422,490 A | * | 3/1890 | Barnes | 119/851 |
| 713,373 A | * | 11/1902 | Allen | 119/851 |
| 1,472,207 A | * | 10/1923 | Courtney | 606/204.55 |
| 2,028,674 A | * | 1/1936 | Larson | 119/851 |
| 2,123,603 A | * | 7/1938 | Henderson | 119/851 |
| 2,232,396 A | * | 2/1941 | Lee et al. | 2/21 |
| 2,704,066 A | * | 3/1955 | Sanden | 606/204.45 |
| 2,925,188 A | * | 2/1960 | Grumbles | 215/257 |
| 3,229,690 A | * | 1/1966 | Schholl | 128/894 |
| 3,967,631 A | * | 7/1976 | Kosal | 132/73 |
| 3,972,325 A | * | 8/1976 | Bluestone | 128/846 |
| 4,474,195 A | * | 10/1984 | Warner | 132/73 |
| 4,651,885 A | * | 3/1987 | Gach | 215/250 |
| 4,908,881 A | * | 3/1990 | Field | 2/21 |
| 4,962,731 A | * | 10/1990 | Wexler | 119/851 |
| 5,065,778 A | * | 11/1991 | Terrell | 132/74.5 |
| 5,123,570 A | * | 6/1992 | Dubow et al. | 222/83 |
| 5,676,990 A | * | 10/1997 | Wawrzynski | 426/305 |
| 6,122,901 A | * | 9/2000 | Schultz et al. | 54/82 |
| 6,457,613 B1 | * | 10/2002 | Patterson | 222/494 |

* cited by examiner

*Primary Examiner*—Charles T. Jordan
*Assistant Examiner*—Jordan Lofdahl
(74) *Attorney, Agent, or Firm*—Marshall A. Lerner; Marvin H. Kleinberg; Kleinberg & Lerner, LLP

(57) ABSTRACT

A pet toe nail cover is provided with a predetermined quantity of liquid adhesive that is stored at the tip end of the cover. The liquid adhesive is covered by a frangible seal which can be penetrated by the animal toe nail when the cover is fitted on the toe nail. The adhesive is released and cures in place, firmly attaching the cover to the toe nail. In alternative embodiments, the cover can be provided with a reservoir end covered by an airtight seal or the adhesive can be provided in a capsule or globule that is stored in the cover and penetrated when the cover is applied to a toe nail.

6 Claims, 1 Drawing Sheet

ANIMAL TOE NAIL COVERS

This is a continuation-in-part of provisional patent application Ser. No. 60/354,638, filed Feb. 5, 2002.

BACKGROUND OF THE INVENTION

1. Field of the Invention

The present invention relates to a protective device for animal toe nails. More particularly, the present invention relates to protective covers configured for and applied to, the toe nails of small, domesticated animals, such as birds, dogs and cats, providing protection for themselves, people or property.

2. Description of the Related Art

U.S. Pat. No. 4,962,731 describes a protective cover for animal toe nails. Similar covers are currently manufactured and marketed under the trademark "Soft Paws". These covers are applied to animal toe nails in order to prevent the damage that animal nails can cause to people or property. Nail covers provide a humane alternative to declawing.

Applying protective covers is a significant and messy chore. The covers are attached to the animal's nails using a cyanoacrylate adhesive (for example under the trademark Super Glue®. Getting the proper amount of adhesive into the nail cover before application is quite tricky. It also requires two hands, one to hold the cover itself, and the other to manipulate the tube of adhesive.

As a result, applying protective covers usually requires two people, one to perform the actual installation, and another to restrain the, animal during the operation. Applying protective covers is sufficiently difficult that many consumers choose to have the covers applied by trained professionals.

It is an object of the present invention to provide an improvement to the basic Soft Paws® cover design that makes the covers easier to apply. Specifically, it is an object of the present invention to make it possible to apply animal toe nail covers with one hand, thereby making it possible for one person to apply the covers without assistance.

SUMMARY OF THE INVENTION

The present invention solves the problem in a simple and straightforward manner. The cyanoacrylate adhesive is injected into the toe nail cover during manufacture. A thin membrane prevents the adhesive from curing until the nail cover is applied. During application, the animal's nail pierces the membrane thereby releasing the adhesive.

Because it is no longer necessary for the consumer to apply adhesive to the nail cover as a separate step during application, the application process is considerably simplified. In fact, application now consists of a single step: the cover is pressed onto the animal's nails with sufficient force to pierce the protective membranes and release the adhesive. The strength of the membrane must be carefully controlled so that the amount of force required to pierce it is not excessive while still making the membrane strong enough to reliably contain the adhesive until application.

There are various ways of manufacturing the improved toe nail cover. One method is to mold the cover in two pieces, one of which contains a cavity that serves as a reservoir for the adhesive, while the other includes the protective membrane. These two pieces are then fused together, possibly using a small quantity of the very adhesive in the reservoir.

Another possible method of manufacture is to enclose a small quantity of adhesive entirely within a capsule having a thin flexible wall or membrane (rather like a tiny water balloon). The resulting sub-assembly is inserted into a nail cover which is manufactured in the usual way.

It is not necessary to perform the insertion step during manufacture. The product could be delivered to the end user as a quantity of unimproved nail covers and an approximately equal quantity of adhesive capsules or globules. This makes application slightly more complicated because the end-user must first insert the adhesive globules into the nail covers.

However, because the adhesive is not exposed to air until the cover is actually applied, the insertion of the adhesive globule can be performed well in advance of the actual application of the nail cover onto the animal. This is still a significant improvement over the current state of the art where there is a very short window of opportunity to apply the nail cover before the adhesive cures.

Other methods of manufacture are also possible.

DETAILED DESCRIPTION OF THE PREFERRED EMBODIMENT

Figure 1:
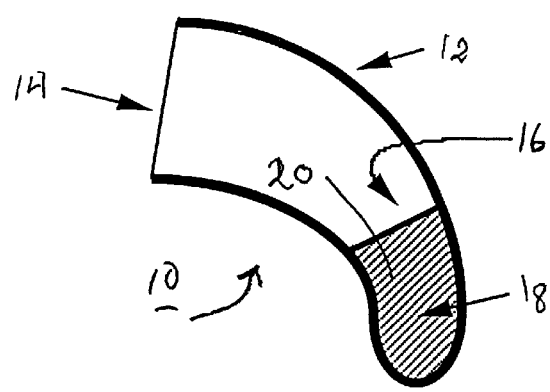
FIG. 1 is a cutaway view of the nail cover with applied adhesive and protective membrane.

FIG. 1 shows a cutaway view of an individual nail cover 10. The main body 12 of the cover has an open end 14 through which the animal's nail is inserted. A membrane 16 encloses a reservoir 18 which is filled with adhesive 20. The membrane 16 prevents the adhesive 20 from contacting air and curing until the animal's nail is inserted. The nail punctures the membrane 16, releasing the adhesive 20 which permits the adhesive 20 to flow around the nail and cure in place, adhering the nail to the cover 10

Figure 2:
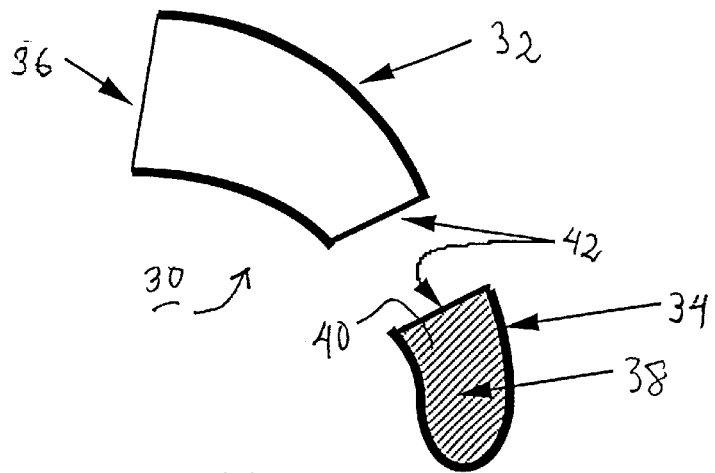
FIG. 2 is a cutaway view of the two pieces of the cover during manufacture.

FIG. 2 shows one possible method of manufacture. A cover 30 is fabricated in two pieces, 32, 34. The first piece 32 incorporates an opening 36 through which the animal's nail is introduced. The second piece 34 is enclosed and forms a reservoir 38 for the adhesive 40. A membrane 42 is fabricated as part of either of the two main pieces 32, 34, or both. The two pieces 2, 34 are then joined together to form the finished nail cover 30.

Figure 3:
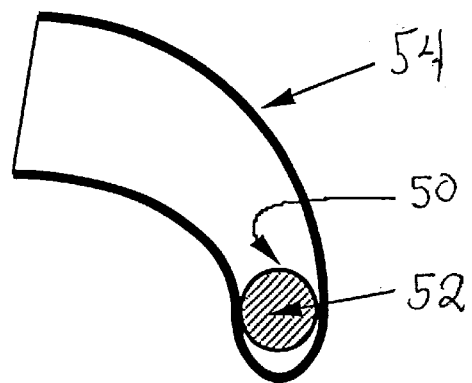
FIG. 3 is a cutaway view of an alternate embodiment of the invention showing a separate toe nail cover and adhesive globules.

FIG. 3 shows an alternative method of manufacture for the improved nail cover of the present invention. In this embodiment, the membrane of FIGS. 1 and 2 is replaced with a capsule or globule 50 which contains the liquid adhesive 52, This sub-assembly is inserted into the main body 54 of a prior art nail cover and simply lodges in the narrow end of the cover with a friction fit until it is pierced by the insertion of the animal's nail.

Other alternative embodiments and variations will occur to those skilled in the art. Accordingly, the invention should be limited only by the scope of the claims appended hereto.

What is claimed as new is:

1. A covering for an animal toe nail comprising:
   (a) an elongated sheath having an interior cavity, said interior cavity roughly conforming to the size and shape of an animal's toe nail, said sheath having an open end and a closed end;
   (b) a frangible membrane partitioning off a portion of said interior cavity into an enclosed reservoir portion; and (c) a quantity of liquid adhesive sealed within said enclosed reservoir portion;

whereby insertion of an animal nail into said interior cavity ruptures said membrane, releasing said liquid adhesive to adhere the covering to the animal nail.

2. The covering of claim 1 wherein said membrane and reservoir comprise a physically distinct sub-assembly.

3. The combination with a covering for animal claws, the covering including an elongated sheath with an internal cavity, of an adhesive system comprising: a measured quantity of liquid adhesive contained within a frangible capsule adapted to fit within the elongated sheath and positioned to be contacted by an inserted animal claw:

whereby insertion of an animal claw into the sheath ruptures said capsule, releasing said liquid adhesive to be cured in situ.

4. A covering for an animal toe nail comprising:

(a) an elongated sheath having an interior cavity, said interior cavity roughly conforming to the size and shape of an animal's toe nail, said sheath having an open end and a closed end;

(b) a quantity of liquid adhesive sealed within said interior cavity; and (c) a frangible barrier between said liquid adhesive occupying that portion of said interior cavity otherwise adapted to receive the animal toe nail and the remaining interior cavity of said sheath, whereby insertion of an animal nail into said interior cavity ruptures said barrier, releasing said liquid adhesive to adhere the covering to the animal nail.

5. The combination of claim 4, wherein said frangible barrier is a membrane sealing said liquid adhesive within said interior cavity.

6. The combination of claim 4, wherein said frangible barrier is a capsule enclosing said liquid adhesive and said capsule is adapted to be inserted and retained within said interior cavity and positioned to be ruptured by an inserted animal toe nail.

\* \* \* \* \*